US009615022B2

(12) United States Patent
Bernal et al.

(10) Patent No.: US 9,615,022 B2
(45) Date of Patent: Apr. 4, 2017

(54) HIGH-RESOLUTION IMAGING DEVICES USING LOW-RESOLUTION SENSORS AND COMPRESSIVE SENSING EXPLOITING JOINT SPARSITY

(71) Applicant: Xerox Corporation, Norwalk, CT (US)

(72) Inventors: Edgar A. Bernal, Webster, NY (US); Xuejin Wen, Fairport, NY (US); Qun Li, Webster, NY (US); Raja Bala, Pittsford, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/566,835

(22) Filed: Dec. 11, 2014

(65) Prior Publication Data

US 2016/0173771 A1 Jun. 16, 2016

(51) Int. Cl.
*H04N 5/232* (2006.01)
*H04N 5/225* (2006.01)

(52) U.S. Cl.
CPC ....... *H04N 5/23232* (2013.01); *H04N 5/2254* (2013.01); *H04N 5/2259* (2013.01)

(58) Field of Classification Search
CPC . H04N 5/23232; H04N 5/2259; H04N 5/2254
See application file for complete search history.

(56) References Cited

U.S. PATENT DOCUMENTS

| 7,602,183 | B2 | 10/2009 | Lustig et al. |
| 7,834,795 | B1 | 11/2010 | Dudgeon et al. |
| 8,125,549 | B2 | 2/2012 | Dekel |
| 8,570,405 | B2 | 10/2013 | Kelly et al. |
| 8,570,406 | B2 | 10/2013 | Kelly et al. |
| 8,717,466 | B2 | 5/2014 | Baraniuk et al. |
| 8,760,542 | B2 | 6/2014 | Bridge et al. |
| 2004/0027462 | A1 | 2/2004 | Hing |
| 2006/0239336 | A1 | 10/2006 | Baraniuk et al. |
| 2012/0188433 | A1 | 7/2012 | Miyawaki |
| 2014/0063314 | A1 | 3/2014 | Sankaranarayanan et al. |
| 2014/0168482 | A1* | 6/2014 | Herman ................ G06T 5/001 348/241 |

(Continued)

FOREIGN PATENT DOCUMENTS

WO WO 2011/103601 8/2011

OTHER PUBLICATIONS

Duarte, M. F., "Distributed Compressed Sensing of Jointly Sparse Signals," Conference Record of the Thirty-Ninth Asilomar Conference on Signals, Systems and Computers (2005), Oct. 28-Nov. 1, pp. 1537-1541.

(Continued)

*Primary Examiner* — Mekonnen Dagnew
(74) *Attorney, Agent, or Firm* — Kevin Soules; Kermit D. Lopez; Luis M. Ortiz

(57) ABSTRACT

A method and system for reconstructing an image of a scene comprises configuring a digital light modulator according to a spatially varying pattern. Light energy associated with the scene and incident on the spatially varying pattern is collected and optically focused on the photodetectors. Data indicative of the intensity of the focused light energy from each of said at least two photodetectors is collected. Data from the photodetectors is then combined to reconstruct an image of the scene.

18 Claims, 11 Drawing Sheets

(56) References Cited

U.S. PATENT DOCUMENTS

| | | |
|---|---|---|
| 2014/0177384 A1* | 6/2014 | Boufounos ............. G01S 13/89 367/7 |
| 2014/0267881 A1 | 9/2014 | Bernal et al. |
| 2015/0042764 A1* | 2/2015 | Xi ...................... H04N 13/0242 348/47 |

OTHER PUBLICATIONS

Majumdar, A. et al., "Algorithms to Approximately Solve NO Hard Row-Sparse MMV Recovery Problem: Application to Compress Color Imaging," IEEE Journal of Emerging and Selected Topics in Circuits and Systems (2012) 2(3):362-369.

* cited by examiner

HIGH-RESOLUTION IMAGING DEVICES USING LOW-RESOLUTION SENSORS AND COMPRESSIVE SENSING EXPLOITING JOINT SPARSITY

TECHNICAL FIELD

Embodiments are generally related to the field of imaging. Embodiments are also related to methods and systems for high-definition imaging using low-resolution sensors and compressive sensing technology. Embodiments are further related to methods and systems for high-resolution imaging devices using low-resolution sensors and compressive sensing technology, by exploiting joint sparsity.

BACKGROUND OF THE INVENTION

The interaction of image processing and computer vision technologies with imaging technologies has led to advancements in fields such as transportation monitoring, surveillance, and medical imaging, among others. In some applications, very high-resolution images are required to support algorithms for spatial feature extraction, tracking applications where object trajectories need to be known with certain accuracy, etc.

For example, in applications such as detecting the contour of a cancerous tumor in a human body, high-resolution thermal imaging is required. Silicon-based visible and near infrared (NIR) imaging sensors such as charge-coupled device (CCD) and complementary metal-oxide-semiconductor (CMOS) can be manufactured via common and inexpensive silicon processing techniques. Since silicon is photosensitive in the visible electromagnetic (EM) range, it is then possible to fabricate red-green-blue (RGB) and NIR sensors with resolutions of up to 10000 (H)×7096 (V) pixels on a 35 mm (diagonal length) chip relatively inexpensively. However, for thermal imaging (and other applications) the required pixel size is large in dimension by nature, and photo-sensitive material with sensitivity in those EM bands is not compatible with silicon manufacturing technologies. Thus, high-resolution imaging sensor chips sensitive in the thermal band are difficult and expensive to produce.

A need therefore exists for methods, systems, and apparatuses that enable high-definition imaging beyond the visible EM range by leveraging low-resolution sensor chips and compressive sensing concepts exploiting joint sparsity assumptions.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for imaging.

It is another aspect of the disclosed embodiments to provide a method and system for high-resolution imaging using low-resolution sensors.

It is yet another aspect of the disclosed embodiments to provide an enhanced method and system for high-resolution imaging using low-resolution sensors using compressive sensing techniques and exploiting joint sparsity.

The aforementioned aspects and other objectives and advantages can now be achieved as described herein. A method and system for reconstructing an image of a scene comprises configuring a digital light modulator according to a spatially varying pattern, collecting and optically focusing light energy associated with the scene incident on the spatially varying pattern on each of at least two photodetectors; collecting data indicative of the intensity of the focused light energy from each of the at least two photodetectors; and combining the data from the at least two photodetectors to reconstruct an image of the scene.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
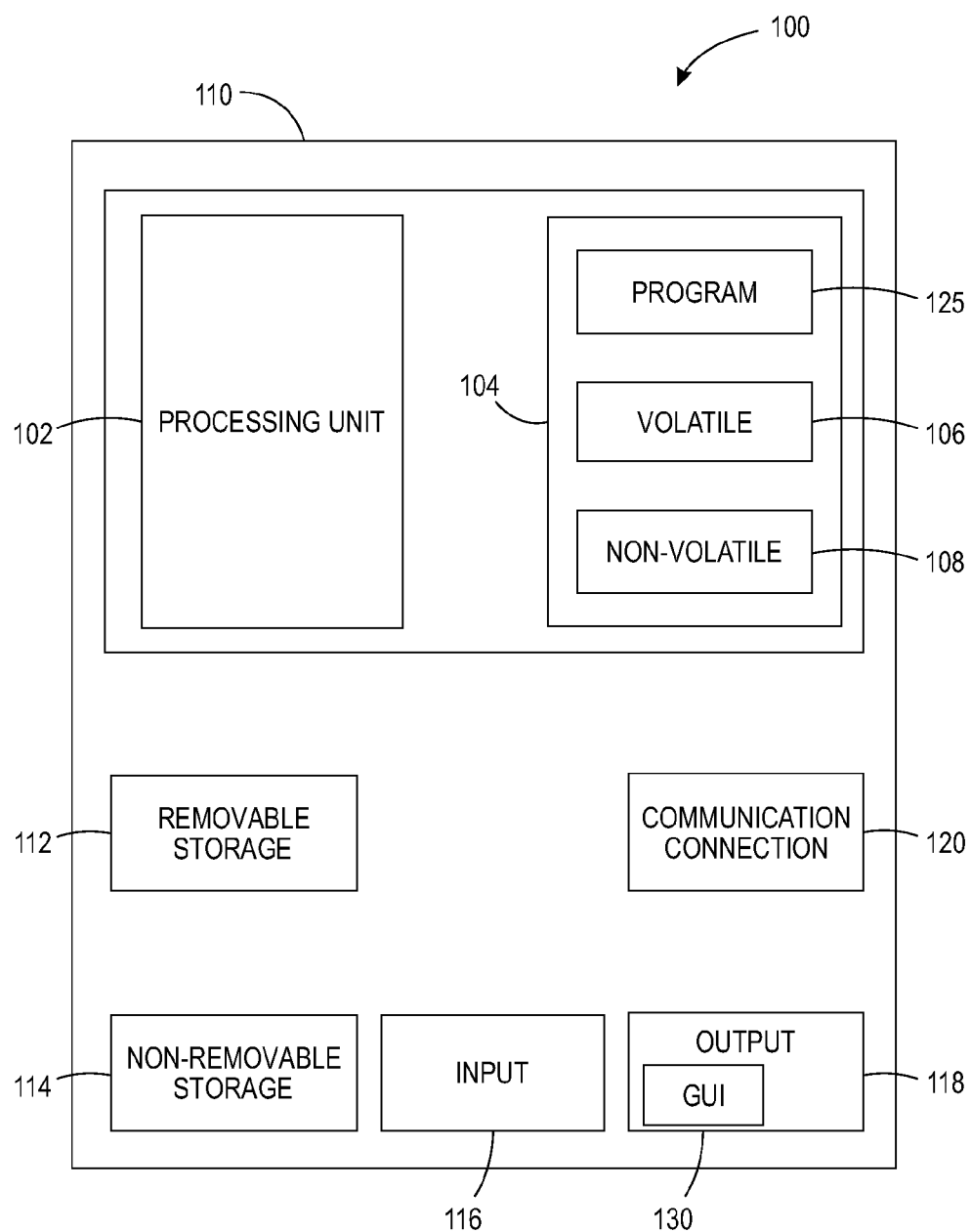
FIG. 1A depicts a block diagram of a computer system which is implemented in accordance with the disclosed embodiments.
Figure 1B:
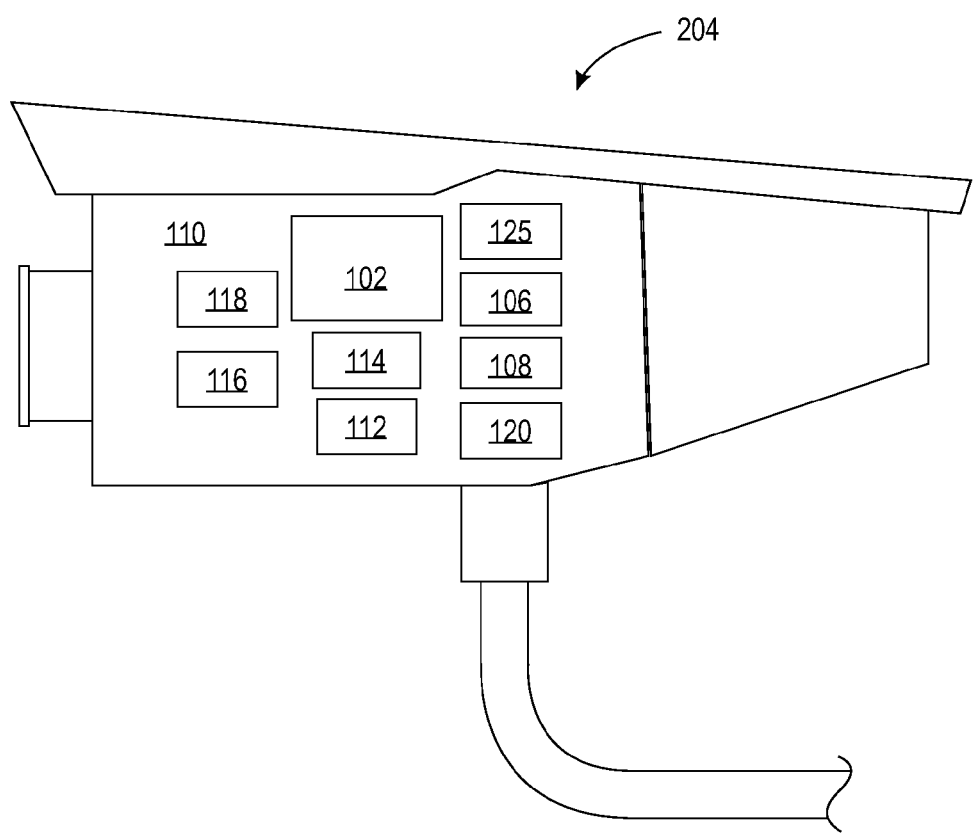
FIG. 1B depicts a block diagram of an image capturing device with an associated computing system which is implemented in accordance with the disclosed embodiments.
Figure 2:
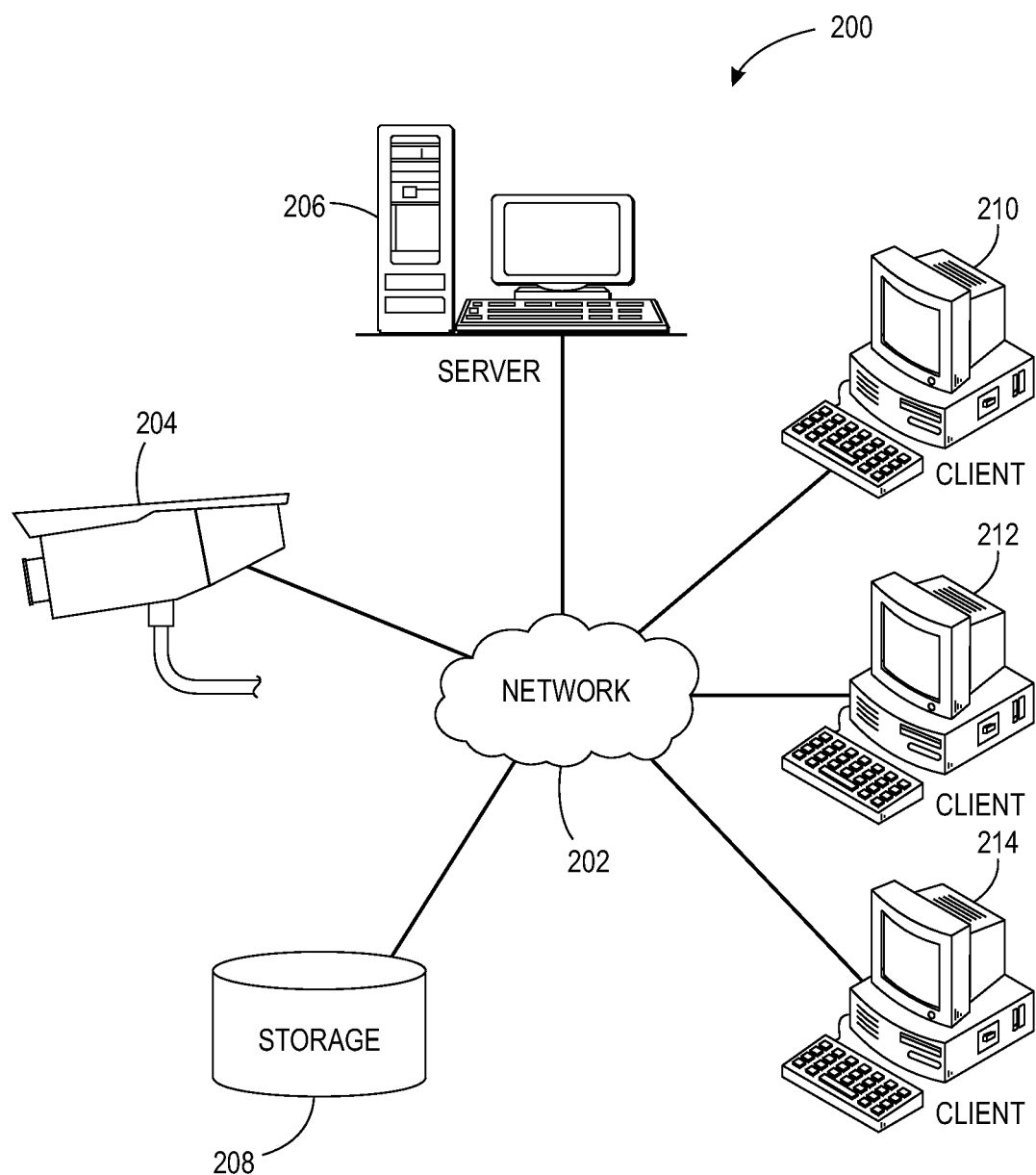
FIG. 2 depicts a graphical representation of a network of data-processing devices in which aspects of the present invention may be implemented.
Figure 3:
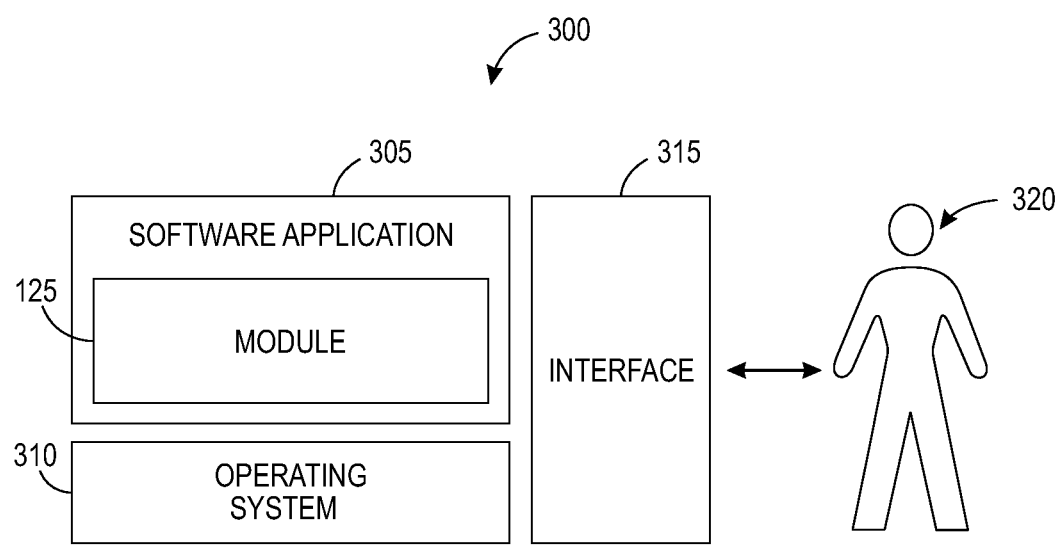
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors and other elements disclosed herein may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a camera, video camera, tracking device, image sensor, or the like. The communication connection may include a Local Area Network (LAN), a Wide Area Network (WAN) or other networks. This functionality is described more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 1B illustrates an alternative embodiment wherein the computer system 110 is integrated in an image capturing device 204. In this embodiment, the image capturing device 204 is equipped with a processor 102, volatile memory 106 and non-volatile memory 108, removable storage 112, non-removable storage 114, and a communication connection 120. Image capturing device 204 can also have an associated input 116 and output 118.

In the embodiment illustrated in FIG. 1B, a program 125 can be implemented using the internal hardware associated with the onboard computer system 110. This enables the processing described below to be implemented without an external computer system or in association with an external computer system. In alternative embodiments, the hardware associated with the onboard computer system may be physically separated from the image capturing device, and both devices linked via a communications network.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as sensor 204, and a memory storage unit such as, for example, memory or database 208.

In the depicted example, sensor 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, medical imaging device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and sensor 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 100, in conjunction with program module 125, data-processing system 200, and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

The embodiments disclosed herein utilize compressive sensing technologies to reconstruct images using an imaging sensor or photodetector array coupled with a spatial or multi-dimensional digital light modulator (DLM). The imaging sensor can comprise a plurality of photosensitive pixels.

In one embodiment of the invention, light from an object/scene is first focused via a lens or other optical system on the surface of a DLM. The DLM is configured according to a series of sampling patterns (usually random or pseudo-random), one pattern per exposure cycle. In one embodiment, when a reflective DLM is used, such as a digital micromirror device (DMD) or a reflective liquid crystal on silicon (LCOS) device, the DLM may be thought of as composed of an array of sub-sections comprised of a set of micromirrors. In other embodiments, transmissive DLMs such as those based on transmissive liquid crystal (LC) may be used; in these cases, the DLM can be thought of as composed of an array of sub-sections comprised of a set of transmissive light modulators. Each of the sub-sections can be mapped to an element in an associated photodetector.

In a single exposure cycle, light incident on the DLM is spatially modulated by the spatial pattern according to which the DLM is configured (or more particularly by each of the sub-sections of the DLM) and the modulated light collected by a photodetector associated with an imaging sensor located downstream in the optical path. Each sub-section of the DLM has an associated optical element such as a lens which focuses light on an individual pixel in the photodetector or imaging sensor. Each photodetector or pixel outputs one measured light intensity value, which corresponds to the intensify of the light modulated according to the random pattern generated in the corresponding sub-section of the DLM.

The DLM can be rearranged according to a different spatial pattern and then the exposure cycle can be repeated. For each exposure cycle, a multiplicity of measured values together with the corresponding spatial patterns, and optionally, joint sparsity assumptions along with measured values and corresponding patterns across neighboring photodetectors or pixels are used to reconstruct the images within the field of view of each pixel in the imaging sensor using compressive sensing theory. The images of individual pixels are then stitched or mosaicked together to form an image of the original object/scene.

Figure 4A:
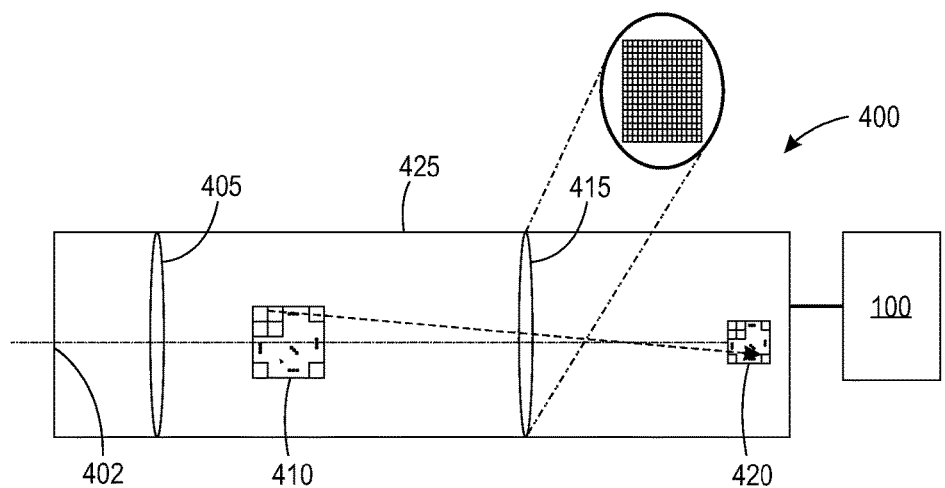
FIG. 4A depicts a system for high-resolution imaging using low-resolution sensors in accordance with the disclosed embodiments.

FIG. 4A illustrates a block diagram 400 associated with systems and methods for rendering high-resolution images using low-resolution sensors and compressive sensing technology by exploiting joint sparsity assumptions.

Figure 5A:
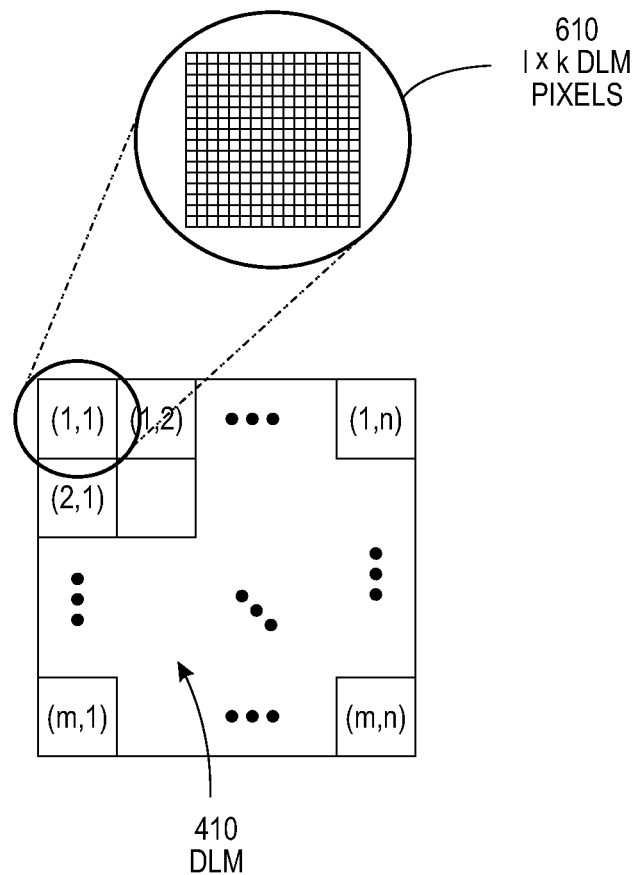
FIG. 5A depicts a mapping between an image sensor and digital light modulator associated with a system and method for high-resolution imaging using low-resolution sensors in accordance with the disclosed embodiments.

In FIG. 4A, imaging system 425 has an optical path including a first lens 405 followed by a DLM 410. DLM 410 can be, for example, an array of reflecting or transmitting elements, such as micro-mirrors in the reflective case, or alternatively, pixels in a liquid crystal (LC) device array in the transmissive case. DLM 410 can be segmented according to an array of sub-sections of size l×k (as shown in FIG. 5A). The set of lenses 415 focus light from each sub-section of the DLM 410 to a relatively low-resolution imaging sensor (or photodetector array) 420, which includes pixels (for example, an array of pixels of size m×n shown in FIG. 5B). In one embodiment, m≤640 and n≤480, but other pixel array sizes may alternatively be used. It should be appreciated that the present invention can include DLMs and imaging sensors with pixel arrays of varying sizes depending on design considerations.

The DLM 410 modulates incoming light 402 according to the spatial pattern configuration, and projects (e.g., reflects or transmits) the modulated light onto the image sensor 420 via lens array 415. In a preferred embodiment, a number of exposures are taken. The characteristics of the spatial pattern according to which DLM 410 is configured are varied for each exposure. This can be accomplished by modifying the configuration of the sub-sections 610 of the DLM 410 between each exposure. It should be appreciated that the new DLM 410 configuration can be achieved very quickly and each exposure can then be taken on the micro to milli second time scale. The light modulated by each of the sub-sections 610 of DLM 410 is projected onto discrete pixels in the image sensor 420. This is achieved by the appropriate design of the optical projection system. This may be a single lens, array of lenses 415, or a subsystem of optical components (not shown).

In a preferred embodiment, multiple exposures (i.e., exposures corresponding to different configurations, for example 510A, 510B, . . . , 510H [where 510A, 510B, . . . , 510H denote an integer number of configurations, usually smaller than l×k] of the l×k-element sub-sections of DLM 410) are taken. For each of the exposures corresponding to configurations 510A, 510B, . . . , 510H, the data from each pixel in the image sensor 420 is saved.

The magnification of this optical projection system is defined by the active dimension of the image sensor 420 divided by the active dimension of the DLM 410, where the active dimension refers to the dimension of the image on the respective device. The data collected by each pixel of the image sensor 420 is then transmitted to computer 100 for processing according to the methods disclosed herein. It should be appreciated that such processing can be accomplished by an external computer system, or imaging system 425 can be incorporated into an image capturing device such as device 204 with an on-board computing device used for image processing.

The resolution of the imaging system 425 may be determined by the resolution of the DLM 410 and by the resolution of the imaging sensor 420, depending on the system configuration. Accordingly, a DLM 410 can be used in conjunction with a relatively low-resolution image sensor 420 to produce images with a high resolution relative to the resolution of the sensor. In one embodiment, sub-sections 610 of DLM 410 associated with individual imaging sensor 420 pixels or photodetectors are defined or derived by computer system 100. In this embodiment, the resolution of imaging system 425 is dictated by the number of pixels in each DLM sub-section 610 and the number of pixels in image sensor 420. For example, if each DLM sub-section 610 consists of 32×32 pixels, and all of the sub-sections are assigned to a pixel in the imaging sensor without any overlap, the pixel count in the final reconstructed image will be equal to the pixel count of the imaging sensor multiplied by a factor of 32×32 (or 1024). If not all of the sub-sections are assigned to a pixel in the imaging sensor, but there is still no overlap between the sub-sections, then the pixel count in the final reconstructed image will be equal to the number of pixels in the imaging sensor that have a DLM sub-section assigned, times the size of the corresponding sub-section. If there is overlap between the DLM sub-sections assigned to a pixel in the imaging sensor, the pixel count in the final reconstructed image will be equal to the number of pixels in the imaging sensor that have a DLM sub-section assigned times the size of its corresponding sub-section; in this case, the final pixel count may be larger than the element count in the DLM. In some embodiments, the sizes of the different DLM sub-sections assigned to the pixels in the imaging sensor may not be equal. For example, in one embodiment, larger sub-sections may be assigned to pixels in the center of the imaging sensor, and the size of the sub-sections may decrease as the distance to the center of the imaging sensor increases.

Figure 4B:
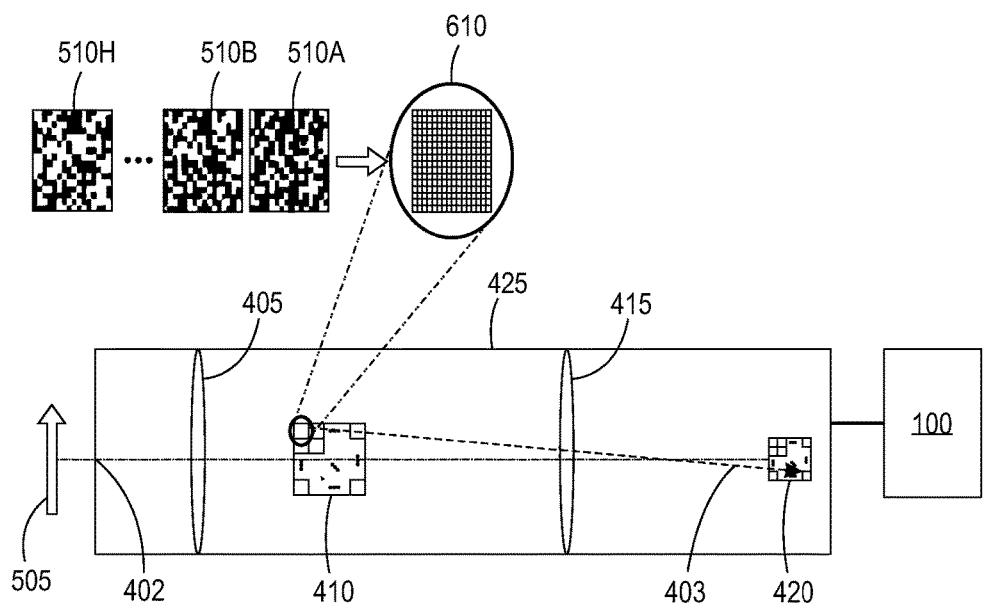
FIG. 4B depicts an alternative embodiment of a system for high-resolution imaging using low-resolution sensors in accordance with the disclosed embodiments.
Figure 5B:
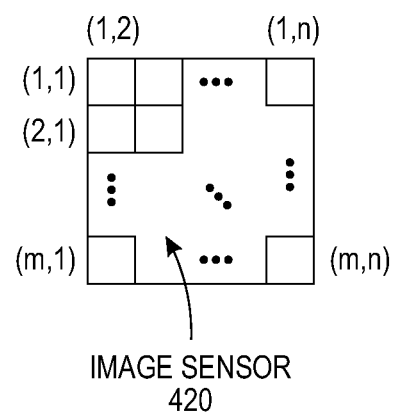
FIG. 5B depicts an image sensor associated with a system and method for high-resolution imaging using low-resolution sensors in accordance with the disclosed embodiments.

FIG. 4B further illustrates the image measurement process using imaging system 425 in accordance with embodiments of the present invention. Light 402 reflected from an object 505 is first incident on lens 405. Lens 405 collects and focuses that light onto DLM 410. A mapping of DLM 410 to image sensor 420 is provided in FIG. 5A. For simplicity, the DLM sub-sections in the illustrated mapping do not overlap, although, depending on the embodiment, the sub-sections may overlap. Each of the l×k-element DLM sub-sections 610 is configured according to a sampling pattern. For example, at a first sub-section of DLM 610 (i.e., sub-section (1,1), DLM 410 has sampling pattern 510A). The image of object 505 corresponding to the light incident on the l×k pixel sub-section 610 is thus modulated by sampling pattern 510A. That modulated light is then projected by one of the array of lenses 415 onto a specific pixel or photodetector (such as pixel (1,1)) associated with the image sensor 420. An exploded view of image sensor 420 is shown in FIG. 5B. The light intensity V1 403 corresponds to the light intensity at imaging pixel (1,1) that results from modulating light incoming into subsection (1,1) by sampling pattern 510A. This intensify is recorded by computer system 100 which may be an independent computer system of a processing system integrated in a camera. This same process is conducted concurrently for each sub-section 610 of DLM 410 so that each pixel in image sensor 420 records an intensity value.

At sampling instant 2, that is, for the second exposure cycle, DLM 410 is rearranged according to a second sampling pattern. For example, at sub-section 610 of DLM 410, a second sampling pattern 510B is used during the second exposure cycle. The image of object 505 corresponding to the light incident on sub-section 610 and modulated by sampling pattern 510B is projected onto a pixel or photo-detector of the image sensor 420 by one of the lenses in lens array 415. The light intensity V2 (not shown) at pixel (1,1) associated with the second exposure cycle is measured by image sensor 420 and recorded by computer system 100.

Concurrently, light is modulated by each of the sub-sections of the DLM 410 and projected discretely onto each element in the image sensor 420 for the second exposure cycle.

This process can be repeated as many times as desired (for example, "M" times). After M measurements, one corresponding to each exposure cycle, M random patterns (510A, 510B, . . . , 510H) will have been used, and M light intensities will have been recorded at, for example, pixel (1,1) associated with DLM sub-section 610. This process is repeated so that M light intensities are measured for each photodetector element or pixel in the image sensor 420, where $1 \leq i \leq m$, $1 \leq j \leq n$.

Once all the measurements from image sensor 420 are taken, an image reconstruction process can be initialed. Generally, the image reconstruction process is completed by a computer such as computer system 100.

Image reconstruction can be accomplished in a number of ways. In one embodiment, the object sub-image area that corresponds to each l×k pixel group in the DLM 410 (shown in FIG. 5A) would be reconstructed independently using traditional compressive sensing algorithms. Compressive sensing uses knowledge of the M sampling patterns and the corresponding M light intensities recorded, along with assumptions about the sparsity of the image of the scene in some domain (e.g., spatial domain, discrete cosine transform domain, wavelet transform domain, etc.) to reconstruct said image. In an alternative embodiment, exploiting the correlation that occurs among neighboring pixels in natural images can lead to a more efficient reconstruction process.

In the first embodiment, a compressive sensing framework can be employed to reconstruct the image or scene. Compressive sensing relies on the use of a set of M sampling functions that correspond to M spatial patterns according to which the light modulator is configured across M successive exposure cycles.

$$\Phi = \{\phi_1, \ldots, \phi_M\} \tag{1}$$

Each sampling function has a dimensionality equivalent to the pixel count of the DLM 410. For example, if the DLM 410 is L×K pixels in size, then each function $\phi_i$ has L×K elements and can accordingly be partitioned into r l×k-element sub-sections, namely $\phi_{i1}, \phi_{i2}, \ldots, \phi_{ir}$, where r is a positive integer that denotes the number of sub-sections in the DLM. Note that when every photodetector in the m×n sensor array is assigned to a DLM sub-section, r=m×n.

Incoming light 402 can be modulated by the DLM 410 according to the plurality of spatial patterns corresponding to the sampling functions. The light reflected/transmitted from sub-sections of the DLM 410 is then focused onto its corresponding pixel s (where $1 \leq s \leq r$), by one of a plurality of lenses 415 of the image sensor 420. Pixel s in the image sensor 420 samples sequential measurements of the light if captures, effectively measuring the magnitude of the inner product:

$$y_{is} = \langle X_s, \phi_{is} \rangle, \tag{2}$$

wherein $X_s$ denotes a vectorized l×k-dimensional matrix representing an l×k-pixel sampled version of the portion of the scene being imaged by pixel s, and $y_{is}$ denotes the i-th measurement obtained by pixel s. Note that the scene image X is formed by stitching together sub-images $X_1, X_2, \ldots, X_r$.

An image of the scene captured by the pixel can then be reconstructed, preferably after M measurements, where M<<L×K. This provides the compressive sensing described herein.

Utilizing matrix notation, the measurements can be stacked into a single expression:

$$Y_s = \phi_s \text{vec}(X_s) \tag{3}$$

where vec(•) denotes matrix vectorization, $\phi_s = [\text{vec}(\phi_{1s}), \ldots, \text{vec}(\phi_{Ms})]^T$ and $Y_s = [y_{1s}, \ldots, y_{Ms}]^T$. Reconstruction is achieved by solving the optimization problem:

$$\hat{X}_s = \text{argmin}\{\|X_s\|_1\} \tag{4}$$

subject to equation 3 where $|\cdot|_1$ denotes the $l_1$ norm operator, and $\hat{X}_s$ is the estimate of $X_s$ recovered from measurements obtained by pixel s. Note that compressive sensing assumes that X is sparse in some domain $\Phi$ (e.g., natural images are assumed to be approximately sparse in the Discrete Cosine Transform (DCT) and wavelet domains). A signal with N entries is called k-sparse if it has at most k nonzero entries. Mathematically, this means that if $X = \Phi x$ for some set of coefficients x, then x has at most k nonzero entries. In practice, a signal is considered sparse if a majority of its entries are zero or close to zero.

In this embodiment, where no overlap exists between sub-sections of the DLM, the compressive sensing manipulation described above could be applied by computer system 100, independently for each of the DLM group/sensor pixel pair to independently reconstruct m×n sub-images, each with a resolution of l×k pixels. The m×n sub-images are then stitched or mosaicked together in order to obtain a high-resolution image of the scene, the relative placement of the sub-images in the stitching process being determined by the relative placement of the corresponding imaging pixels.

In another embodiment, instead of treating each DLM group/sensor pixel pair independently at reconstruction, the correlation that exists in proximal locations of natural images can be exploited via a compressive sensing framework that exploits joint sparsity. Joint sparsity refers to the fact that if two signals are highly correlated, then they are likely to both be sparse in a common domain, such as $\Phi$. Two signals are correlated if they are not independent. The degree of correlation between two signals or sets of data points can be measured with a correlation coefficient. Let $X_1$ and $X_2$ denote the vectorized version of two N-pixel images, that is, $X_i = \{X_{i1}, X_{i2}, \ldots, X_{iN}\}$ for i=1, 2. The correlation coefficient between $X_1$ and $X_2$ can be written as:

$$\rho_{X_1 X_2} = \frac{\sum_{i=1}^{N}(X_{1i} - \overline{X_1})(X_{2i} - \overline{X_2})}{\sqrt{\sum_{i=1}^{N}(X_{1i} - \overline{X_1})^2 \sum_{i=1}^{N}(X_{2i} - \overline{X_2})^2}}, \text{ where}$$

$$\overline{X_i} = \sum_{j=1}^{N} X_{ij}/N$$

In one embodiment, two signals are considered to be highly correlated if their correlation coefficient exceeds a predetermined threshold T. In one embodiment, T=0.6. When two signals are highly correlated, measurements used for the reconstruction of one signal can carry information about another signal, which is jointly sparse with the first. Jointly sparse models include the sparse common component model which represents each signal as the combination of a common mean and an individual variation; and the common supports model in which all signals are reconstructed from the same sparse set of basis vectors, but with different coefficients. It should be appreciated that other joint sparsity models may also be employed in other embodiments of the invention. When the joint sparsity assumption holds, more efficient reconstruction of the image is possible.

In one embodiment, when the common component model is assumed, spatially neighboring l×k pixel sub-images $X_s$ share a common sparse component for different values of s, while each individual sub-image contains a sparse innovation component. In other words, $X_s=Z+Z_s$. This relationship can be assumed to hold across locally neighboring sub-images, or for all sub-images $X_s$ where $1 \leq s \leq r$. In this case, Z, the common component across sub-images is sparse in some domain $\Phi$. Recovery of two sub-images $X_s$ and $X_t$ can be performed jointly by solving the optimization problem $$\hat{X}_u = \mathrm{argmin}\{\|X_u\|_1\}$$

subject to $Y_u = \phi_u \mathrm{vec}(X_u)$, where $$Y_u = \begin{bmatrix} Y_s \\ Y_t \end{bmatrix}, X_u = \begin{bmatrix} X_s \\ X_t \end{bmatrix}, \text{ and } \varphi = \begin{bmatrix} \varphi & \varphi & 0 \\ \varphi & 0 & \varphi \end{bmatrix}$$

for sampling matrix $\phi$. In alternative embodiments, the common component may not be sparse.

In another embodiment, when the common sparse supports model is assumed, spatially neighboring l×k pixel sub-images $X_s$ are sparse in a common domain $\Phi$. That is, if $X_s = \Phi x_s$ and $X_t = \Phi x_t$ for two neighboring sub-images with spatial indices s and t, then both the coefficients required to represent $X_s$ and $X_t$ in domain $\Phi$, namely $x_s$ and $x_t$, have at most k nonzero entries. Under these assumptions, sub-images can be recovered by solving the optimization problem $$\hat{X}_s = \mathrm{argmin}\{\|X_s\|_{2,0}\}$$

subject to equation 3, where $\|X_s\|_{2,0}$ denotes computing the $l_2$ norm across the columns and the $l_0$ norm across the rows. In other words, the solution to the underdetermined system is the one with the largest row-sparsity. In an alternative embodiment, sub-images $X_s$ share a common component for different values of s, while each individual sub-image contains a sparse innovation component, and the shared innovation components are sparse in a common domain.

In one embodiment, a joint sparsity framework in the reconstruction of images associated with adjacent or nearby DLM group/sensor pixel pairs can be used. First, non-overlapping supergroups of p×q DLM groups can be formed. Reconstruction of the p×q sub-images is performed jointly. In this embodiment, the sets of p×q sub-images would be mosaicked or stitched together in order to obtain a high-resolution image of the scene.

In another embodiment, the supergroups can be overlapping. If a given pixel group belongs to P overlapping supergroups, then the final image pixel values can be obtained by aggregating (via averaging or other analytic combination method) over pixel estimates obtained from the P jointly sparse reconstructions. Such an approach exploits correlation within local neighborhoods, thus affording greater compression, at the cost of added computation.

Figure 6:
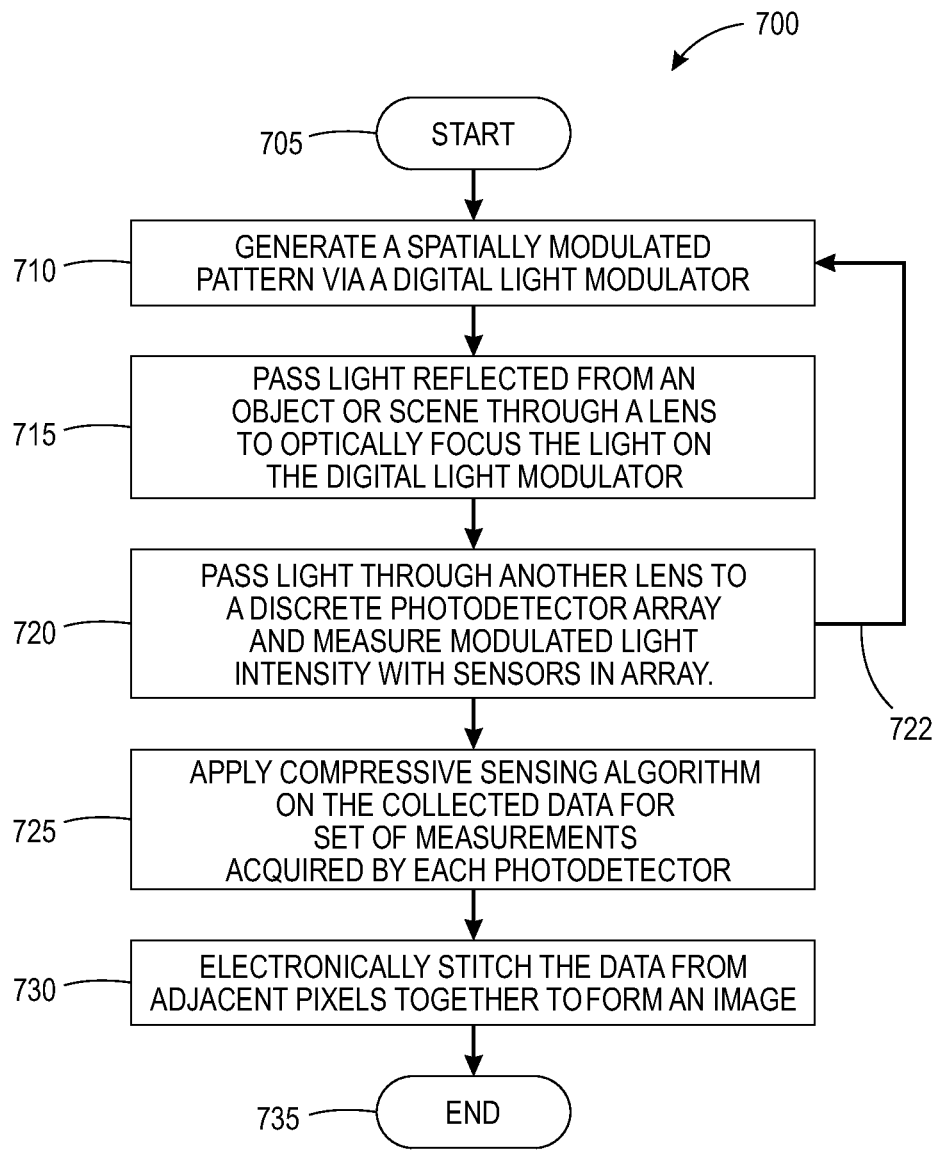
FIG. 6 depicts a flow chart of logical operational steps associated with a method for high-resolution imaging using low-resolution sensors in accordance with the disclosed embodiments.

FIG. 6 illustrates logical operational steps associated with a first approach to capturing an image 700 in accordance with the embodiments disclosed herein. The method begins at step 705.

At step 710, a plurality of spatially varying patterns can be generated which are associated with a digital light modulator. Next at step 715, light reflected from an object can pass through a lens (or system of lenses) to optically focus light on the DLM. The light from each discrete DLM element group then travels to a discrete lens (or other optical system) which focuses the light on a distinct photodetector element, associated with a photodetector array which includes at least one, and perhaps many, pixels as shown at step 720. Each discrete photodetector element measures the light intensity of the incident light. This process is repeated for "M" exposure cycles as shown by arrow 722. It should be appreciated that each of the "M" exposure cycles can be completed in rapid succession and all the exposure cycles can take well under one second to complete. Compressive sensing algorithms, as described above, can be applied at step 725 to the collected data from each of the exposure cycles. This results in an image associated with each pixel representative of a small piece of the object or scene of interest. The images from each of the individual pixels can then be stitched together as shown at step 730, to form an image of the original object or scene. The method ends at step 735.

Figure 7:
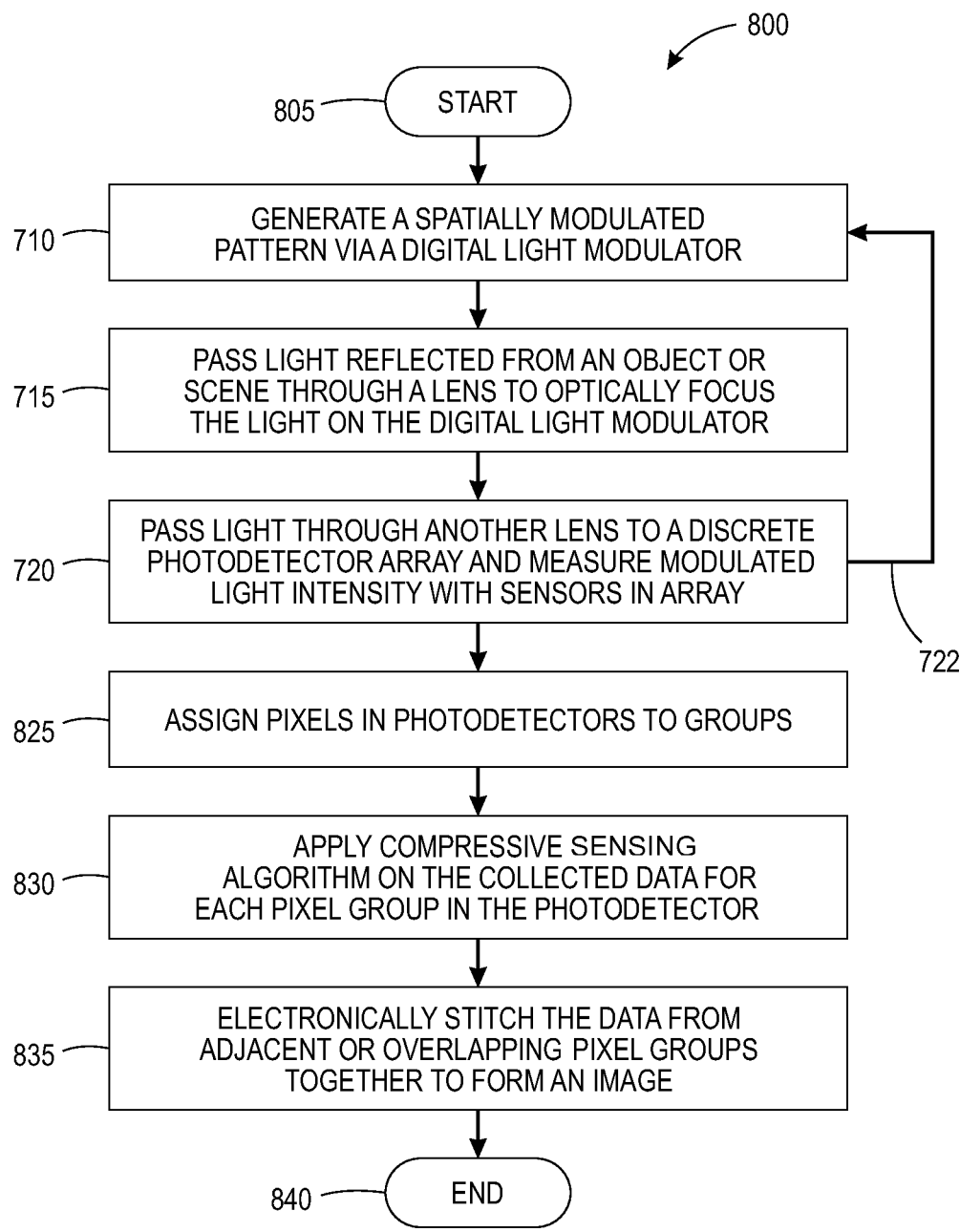
FIG. 7 depicts a flow chart of logical operational steps associated with an alternative method for high-resolution imaging using low-resolution sensors in accordance with the disclosed embodiments.

Similarly, FIG. 7 illustrates logical operational steps associated with another approach to capturing an image 800 in accordance with an alternative embodiment disclosed herein. The method begins at step 805. Steps 710, 715, 720, and 722 are equivalent to those of method 700 and are labeled as such.

At step 825, pixels in the photodetector can be grouped together according to their relative location in the photodetector. This assignment can be accomplished according to the design of the optical system. Once the groups of pixels have been defined, compressive sensing methods can be applied to the collected data for each group of pixels, as shown at step 830. This step results in an image associated with each pixel group. Adjacent images from the pixel groups can then be mosaicked together to form an image of the original object or scene, as shown at step 835. The method ends at step 840.

Figure 8:
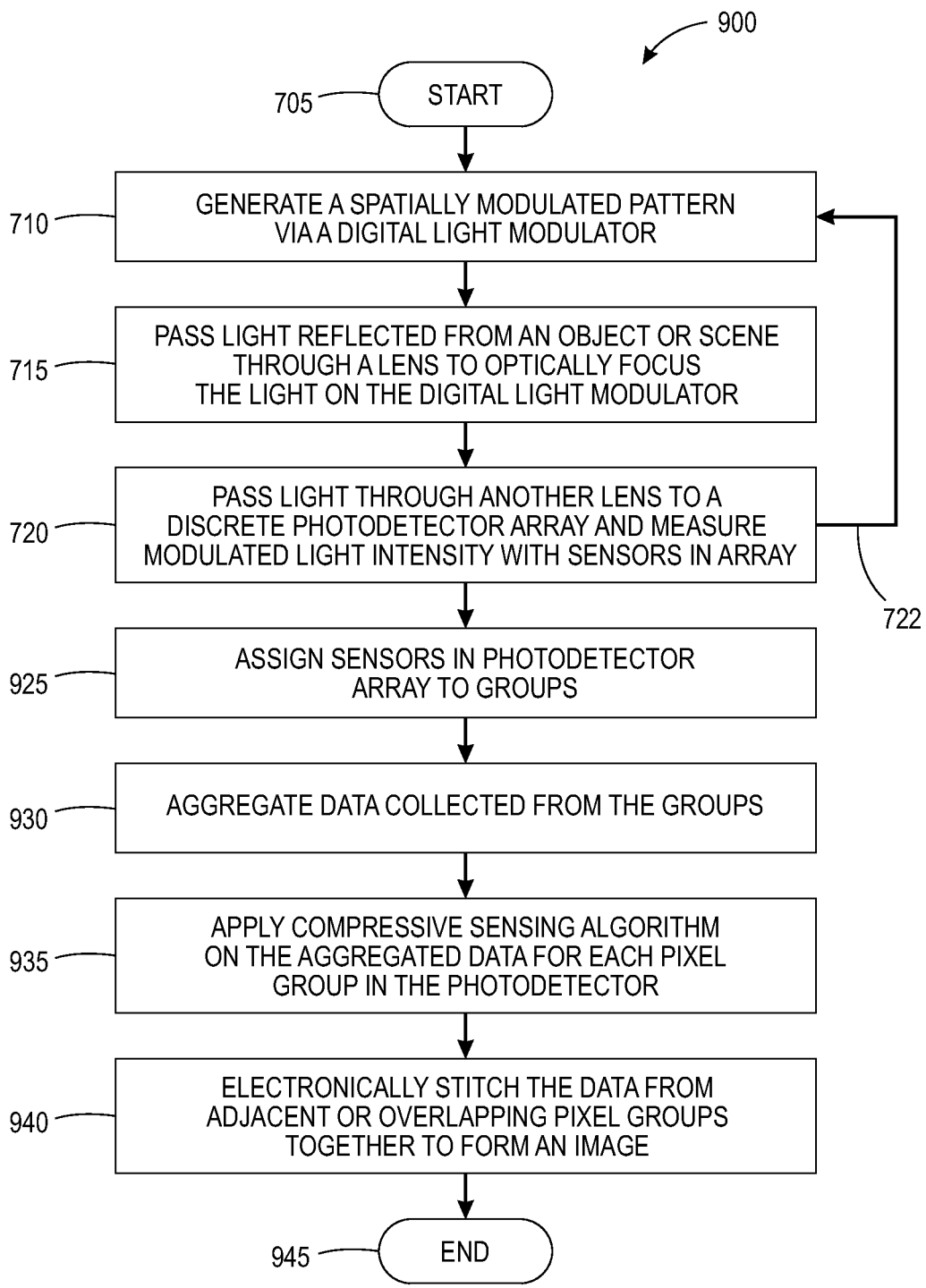
FIG. 8 depicts a flow chart of logical operational steps associated with another alternative method for high-resolution imaging using low-resolution sensors in accordance with the disclosed embodiments.

Finally, FIG. 8 illustrates yet another set of logical operational steps associated with another approach to capturing an image 900 in accordance with an alternative embodiment disclosed herein. The method begins at step 705. Steps 710, 715, 720, and 722 are equivalent to those of method 700 and are labeled as such. At step 925, pixels in the photodetector can be assigned to groups wherein the groups overlap one another. This can be accomplished according to the design of the optical system. At step 930, the data collected from each group can be aggregated and then compressive sensing can be used to recover an image associated with each overlapping pixel group as shown at step 935. Once again, at step 940, the image from each respective pixel group can then be stitched or mosaicked together to form an image of the original object or scene and the method then ends at step 945.

Figure 9A:
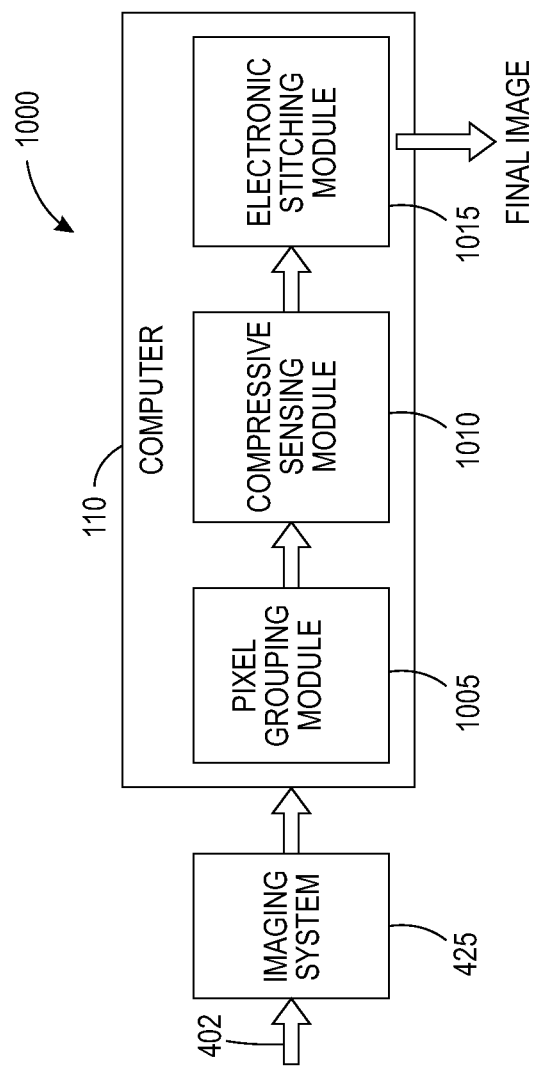
FIG. 9A depicts a block diagram of modules associated with a system and apparatus for implementing a method for high-resolution imaging using low-resolution sensors in accordance with the disclosed embodiments.

FIG. 9A illustrates a block diagram 1000 of modules that can be used to implement method steps as described in FIGS. 6-8. After incident light 402 follows the optical path through imaging system 425, the resulting intensities recorded at the photodetectors can be provided to a computer system 110. The computer system 110 can include a pixel grouping module 1005 that is used to define which pixels will be grouped according to a set of joint sparsity requirements. Compressive sensing module 1010 can be used to apply compressive sensing algorithms to the data collected by imaging system 425. The output from compressive sensing module 1010 includes images associated with each photodetector or group of photodetectors defined by pixel grouping module 1005. This output can be provided to electronic stitching module 1015, which takes all the images from each of the photodetectors and stitches them together to create a final image of the object or scene of interest.

Figure 9B:
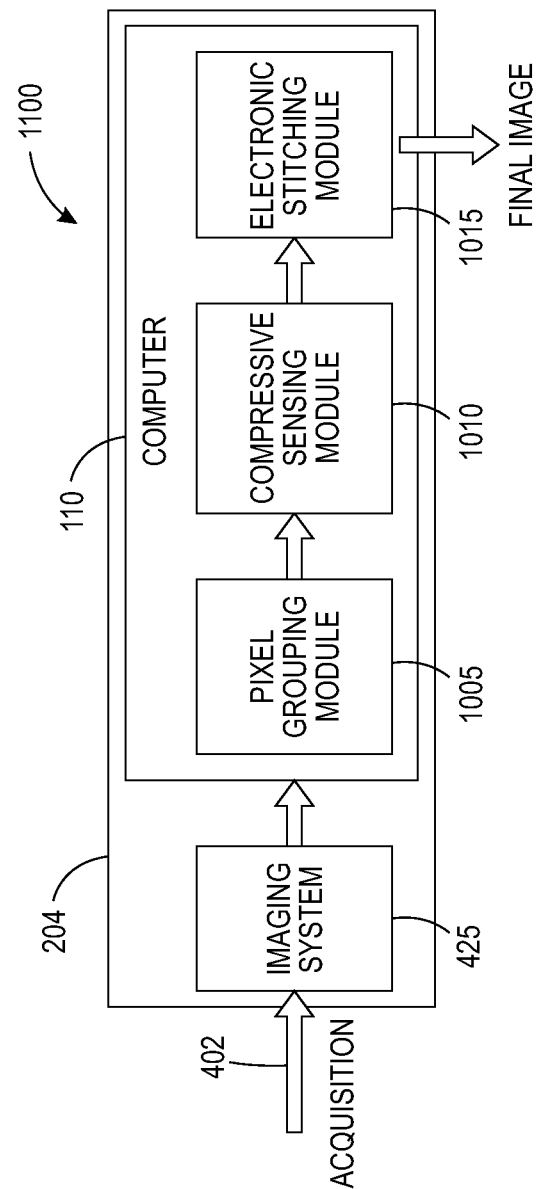
FIG. 9B depicts a block diagram of modules associated with an alternative embodiment of a system and apparatus for implementing a method for high-resolution imaging using low-resolution sensors in accordance with the disclosed embodiments.

FIG. 9B illustrates a block diagram 1100 of an alternative embodiment of modules that can be used to implement the method steps described in FIGS. 6-8. In this embodiment, pixel grouping module 1005, compressive sensing module 1010, and electronic stitching module 1015 are all incorporated in a computing module (such as computer system 110) integrated into image capturing device 204. In addition, the imaging system 425 can be integrated in imaging capturing device 204. In this embodiment, image capturing device 204 comprises a standalone unit configured for high-resolution imaging using low-resolution sensors and compressive sensing technology by exploiting joint sparsity.

Based on the foregoing, if can be appreciated that a number of embodiments, preferred and alternative, are disclosed herein. For example, in one embodiment, a method for reconstructing an image of a scene comprises configuring a digital light modulator according to a spatially varying pattern, collecting and optically focusing light energy associated with the scene incident on the spatially varying pattern on each of at least two photodetectors; collecting data indicative of the intensity of the focused light energy from each of the at least two photodetectors; and combining the data from the at least two photodetectors to reconstruct an image of the scene.

In one embodiment, combining the data from the at least two photodetectors to reconstruct an image of the scene further comprises applying a compressive sensing reconstruction algorithm on the data from each of the at least two photodetectors independently to create an image associated with each of the photodetectors, and arranging the images associated with each of the at least two photodetectors according to the relative location of the photodetectors.

In another embodiment, combining the data from the at least two photodetectors to reconstruct an image of the scene further comprises forming a plurality of photodetector groups by associating the at least two photodetectors with at least two groups of elements in the digital light modulator, wherein the image of the scene associated with each photodetector meets a sparsity requirement. The embodiment further comprises applying a compressive sensing algorithm on the collected data from each of the photodetector groups to create an image associated with each of the photodetector groups, and arranging the images associated with each of the photodetector groups according to the relative location of the photodetector groups.

The sparsity requirement can be a joint sparsity requirement, and can be one of a sparse common component model and a common supports model. The at least two photodetectors comprise at least two pixels associated with a sensor.

In another embodiment, combining the data from the at least two photodetectors to reconstruct an image of the scene further comprises forming a plurality of photodetector groups by associating at least two photodetectors with at least two overlapping groups of elements in the digital light modulator, wherein the image of the scene associated with each photodetector meets a sparsity requirement. The embodiment includes aggregating the data associated with each of the photodetector groups and applying a compressive sensing algorithm on the aggregated data from each of the photodetector groups to create an image associated with each of the photodetector groups. Finally, the images associated with each of the photodetector groups adjacent to each other are arranged to form an image. The sparsity requirement is a joint sparsity requirement comprising one of a sparse common component modal and a common supports model.

In another embodiment, the digital light modulator comprises at least one of an array of at least one pixel; an array of at least one transmissive light modulator; an array of at least one reflective light modulator; and an array of micro-mirrors.

In yet another embodiment, a method for reconstructing an image of a scene comprises configuring a digital light modulator according to a spatially varying pattern; collecting and optically focusing light energy associated with the scene incident on the spatially varying scan pattern on each of at least two photodetectors comprising pixels associated with a sensor; collecting data indicative of the intensity of the focused light energy from each of the at least two pixels; forming a plurality of photodetector groups by associating at least two photodetectors with at least two overlapping groups of elements in the digital light modulator, wherein the image of the scene associated with each photodetector meets a sparsity requirement; aggregating the data associated with each of the photodetector groups; applying a compressive sensing algorithm on the aggregated data from each of the photodetector groups to create an image associated with each of the photodetector groups; and arranging the images associated with each of the photodetector groups adjacent to each other.

Collecting and optically focusing light energy associated with a scene incident on the spatially varying pattern on each of at least two photodetectors comprising pixels associated with a sensor further comprises directing the light energy passing through at least one discrete sub-section of the spatially varying pattern on a discrete one of the at least two photodetectors. The sparsity requirement can be a joint sparsity requirement comprising one of a sparse common component model and a common supports model.

Additionally, the digital light modulator comprises at least one of an array of at least one pixel; an array of at least one transmissive light modulator; an array of at least one reflective light modulator; and an array of micro-mirrors.

In yet another embodiment, a system for reconstructing an image of a scene comprises a digital light modulator configured according to a spatially varying pattern; a lens system configured to optically focus light energy associated with the scene incident on the spatially varying pattern on each of at least two photodetectors, wherein the at least two photodetectors collect data indicative of the intensity of the focused light energy; and a processing module configured to combine the data from the at least two photodetectors to reconstruct an image of the scene.

In one embodiment, the processing module configured to combine the data from the at least two photodetectors to reconstruct an image of the scene further comprises a compressive sensing module configured to apply a compressive sensing reconstruction algorithm on the data from each of the at least two photodetectors independently to create an image associated with each of the photodetectors; and an electronic stitching module configured to arrange the images associated with each of the at least two photodetectors according to the relative location of the photodetectors.

In another embodiment, the processing module configured to combine the data from the at least two photodetectors to reconstruct an image of the scene further comprises a pixel grouping module configured to form a plurality of photodetector groups by associating the at least two photodetectors with at least two groups of elements in the digital light modulator, wherein the image of the scene associated with each photodetector meets a sparsity requirement; a compressive sensing module configured to apply a compressive sensing algorithm on the collected data from each of the photodetector groups to create an image associated with each of the photodetector groups; and an electronic stitching module configured to arrange the images associated with each of the photodetector groups according to the relative location of the photodetector groups.

The sparsity requirement can be a joint sparsity requirement comprising one of a sparse common component model and a common supports model. The at least two photodetectors comprise at least two pixels associated with a sensor.

In another embodiment, the digital light modulator, the lens system, the at least two pixels, and the processing module are integrated in an image capturing device.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for 'reconstructing: an Image of a scene comprising; configuring a digital light modulator according to a spatially varied pattern; collecting and optically focusing light energy associated with said scene incident on said spatially varying pattern on each of at least two photodetectors; altering said spatially varied pattern at least once and collecting and optically focusing light energy associated with said scene incident on said at least one altered spatially varied pattern on each of said at least two photodetectors; collecting data indicative of an intensity of the focused light energy from each of said at least two photodetectors for each of said at least one altered spatially varied pattern: and combining said data from said at least two photodetectors to reconstruct an image of said scene; combining said data from said at least two photodetectors to reconstruct an image of said scene further comprises: forming a plurality of photodetector groups by associating at least two photodetectors with at least two overlapping groups of elements in said digital light modulator, wherein said image of said scene associated with each photodetector meets a sparsity requirement;
   aggregating said data associated with each of said photodetector groups; applying a compressive sensing algorithm on said aggregated data from each of said photodetector groups to create an image associated with each of said photodetector groups; and arranging said images associated with each of said photodetector groups according to the relative location of the photodetector groups.

2. The method of claim 1 wherein combining said data from said at least two photodetectors to reconstruct an image of said scene further comprises:
   applying a compressive sensing reconstruction algorithm on said data from each of said at least two photodetectors independently to create an image associated with each of said photodetectors; and
   arranging said images associated with each of said at least two photodetectors according to a relative location of the photodetectors.

3. The method of claim 1 wherein combining said data from said at least two photodetectors to reconstruct an image of said scene further comprises:
   forming a plurality of photodetector groups by associating said at least two photodetectors with at least two groups of elements in said digital light modulator, wherein said image of said scene associated with each photodetector meets a sparsity requirement;
   applying a compressive sensing algorithm on said collected data from each of said photodetector groups to create an image associated with each of said photodetector groups; and
   arranging said images associated with each of said photodetector groups according to the relative location of the photodetector groups.

4. The method of claim 3 wherein said sparsity requirement is a joint sparsity requirement.

5. The method of claim 4 wherein said joint sparsity requirement is one of:
   a sparse common component model; and
   a common supports model.

6. The method of claim 3 wherein said at least two photodetectors comprise at least two pixels associated with a sensor.

7. The method of claim 1 wherein said sparsity requirement is a joint spartsity requirement comprising one of: a sparse common component model; and a common supports model.

8. The method of claim 1 wherein said digital light modulator comprises at least one of:
   an array of at least one pixel;
   an array of at least one transmissive light modulator;
   an array of at least one reflective light modulator; and
   an array of micro-mirrors.

9. A method for reconstructing an image of a scene comprising:
   configuring a digital light modulator according to a spatially varied pattern;
   collecting and optically focusing light energy associated with said scene incident on said spatially varied scan pattern on each of at least two photodetectors comprising pixels associated with a sensor;
   altering said spatially varied pattern at least once and collecting and optically focusing light energy associated with said scene incident on said at least one altered spatially varied pattern on each of said at least two photodetectors:
   collecting data indicative of an intensity of the focused light energy from each of said at least two pixels for each of said at least one altered spatially varied pattern;
   forming a plurality of photodetector groups by associating at least two photodetectors with at least two overlapping groups of elements in said digital light modulator, wherein said image of said scene associated with each photodetector meets a sparsity requirement;
   aggregating said data associated with each of said photodetector groups;
   applying a compressive sensing algorithm on said aggregated data from each of said photodetector groups to create an image associated with each of said photodetector groups; and
   arranging said images associated with each of said photodetector groups adjacent to each other in order to reconstruct said image of said scene.

10. The method of claim 9 wherein collecting and optically focusing light energy associated with a scene incident on said at least one spatially varied pattern on each of at least two photodetectors comprising pixels associated with a sensor further comprises:
   directing said light energy passing through at least one discrete sub-section of said at least one spatially varied pattern on a discrete one of said at least two photodetectors.

11. The method of claim 10 wherein said sparsity requirement is a joint sparsity requirement.

12. The method of claim 11 wherein the joint sparsity requirement is one of:
a sparse common component model; and
a common supports model.

13. The method of claim 12 wherein said digital light modulator comprises at least one of:
an array of at least one pixel;
an array of at least one transmissive light modulator;
an array of at least one reflective light modulator; and
an array of micro-mirrors.

14. A system for reconstructing an image of a scene comprising: a digital fight modulator configured according to a spatially varied pattern wherein said spatially varied pattern is altered at least once:
a lens system configured to optically focus light energy associated with said scene incident on said at least one spatially varying varied pattern on each of at least two photodetectors,
wherein said at least two photodetectors collect data Indicative of an intensity of the focused light energy; and a processing module configured to combine said data from said at least two photodetectors for each of said at least one altered spatially varied pattern to reconstruct an image of said scene wherein said processing module configured to combine said data from said at least two photodetectors to reconstruct an image of said scene further comprises:
a pixel grouping module configured to form a plurality of photodetector groups by associating said at least two photodetectors with at least two groups of elements in said digital fight modulator, wherein said image of said scene associated with each photodetector meets a sparsity requirement; a compressive sensing module configured to apply a compressive sensing algorithm on said collected data from each of said photodetector groups to create an image associated with each of said photodetector groups; and an electronic stitching module configured to arrange said images associated with each of said photodetector groups according to the relative location of the photodetector groups.

15. The system of claim 14 wherein said processing module configured to combine said data from said at least two photodetectors to reconstruct an image of said scene further comprises:
a compressive sensing module configured to apply a compressive sensing reconstruction algorithm on said data from each of said at least two photodetectors independently to create an image associated with each of said photodetectors; and
an electronic stitching module configured to arrange said images associated with each of said at least two photodetectors according to a relative location of the photodetectors.

16. The system of claim 14 wherein said sparsity requirement is a joint sparsity requirement comprising one of: a sparse common component model; and a common supports model.

17. The system of claim 14 wherein said at least two photodetectors comprise at least two pixels associated with a sensor.

18. The system of claim 14 wherein said digital light modulator, said lens system, said at least two pixels, and said processing module are integrated in an image capturing device.

* * * * *